United States Patent
Kamio

(10) Patent No.: US 7,370,609 B2
(45) Date of Patent: May 13, 2008

(54) INTERNAL COMBUSTION ENGINE SYSTEM

(75) Inventor: Junichi Kamio, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/723,914

(22) Filed: Mar. 22, 2007

(65) Prior Publication Data
US 2007/0221163 A1     Sep. 27, 2007

(30) Foreign Application Priority Data
Mar. 23, 2006     (JP) ................................ 2006-81496

(51) Int. Cl.
  *F02M 25/00*     (2006.01)
  *F02B 47/00*     (2006.01)
  *F02B 7/00*      (2006.01)
(52) U.S. Cl. .................. 123/1 A; 123/3; 123/25 C; 123/431
(58) Field of Classification Search ............. 123/1 A, 123/2–3, 304, 431, 525, 527, 575, 556–557, 123/295
See application file for complete search history.

(56) References Cited

U.S. PATENT DOCUMENTS

| | | | |
|---|---|---|---|
| 6,935,284 B2 * | 8/2005 | Qian et al. ............ | 123/3 |
| 7,263,967 B2 * | 9/2007 | Hotta et al. .......... | 123/275 |
| 7,290,505 B2 * | 11/2007 | Kamio et al. ........ | 123/1 A |
| 2007/0163537 A1 * | 7/2007 | Kamio et al. ........ | 123/304 |

FOREIGN PATENT DOCUMENTS

| | | |
|---|---|---|
| JP | 58-96155 A | 6/1983 |
| JP | 2001-152919 A | 6/2001 |
| JP | 2002-130006 A | 5/2002 |

* cited by examiner

*Primary Examiner*—Hai Huynh
(74) *Attorney, Agent, or Firm*—Birch, Stewart, Kolasch & Birch, LLP

(57) ABSTRACT

An internal combustion engine system uses a blended fuel of gasoline and ethanol, operates with high efficiency, and can inhibit nitrogen oxide and the like from being discharged. The internal combustion engine system includes: a fuel tank 3 that accommodates a blended fuel having an octane number of 80 to 100, which has been prepared by blending gasoline having the octane number of 30 to 85 and ethanol into a weight ratio between 9:1 and 6:4; A separating device for adding water to the blended fuel to separate the blended fuel into the gasoline and an ethanol-water mixture liquid; A reforming device for reforming one part of the ethanol-water mixture liquid to produce a mixture liquid of diethyl ether and water; and fuel injectors which independently inject each of the gasoline, the ethanol-water mixture liquid and the mixture liquid of diethyl ether and water.

8 Claims, 4 Drawing Sheets

INTERNAL COMBUSTION ENGINE SYSTEM

BACKGROUND OF THE INVENTION

1. Field of the Invention

The present invention relates to an internal combustion engine system which uses a blended fuel of gasoline and ethanol, and can switch back and forth between spark ignition combustion and homogeneous charge compression ignition combustion.

2. Description of the Related Art

In recent years, in order to improve fuel efficiency and reduce the emission of an internal combustion engine, a compression ignition internal combustion engine represented by a homogeneous charge compression ignition internal combustion engine has been studied. However, the above described homogeneous charge compression ignition internal combustion engine has a problem that the engine has a narrow stably-operatable region, because the engine easily causes knocking when a high load is required, and easily causes misfire when a low load is required.

In order to solve the above described problem, a homogeneous charge compression ignition internal combustion engine has been conventionally known which is an internal combustion engine using gasoline, and can switch back and forth between spark ignition combustion and homogeneous charge compression ignition combustion (cf. Japanese Patent Laid-Open No. 2002-130006 and Japanese Patent Laid-Open No. 2001-152919, for instance).

The above described homogeneous charge compression ignition internal combustion engine usually conducts the above described homogeneous charge compression ignition combustion, and conducts the above described spark ignition combustion only when a requested load is higher than usual or lower than usual. The above described spark ignition combustion has an advantage of being capable of forcefully igniting fuel with a spark at the optimal timing, but has a disadvantage of greatly decreasing thermal efficiency when using a single fuel, because of needing to delay ignition timing to later timing than the optimal timing for avoiding knocking when a high load is required.

On the other hand, it has been known to use a blended fuel of gasoline and ethanol as a fuel for an internal combustion engine. It has been known that the above described blended fuel can provide a so-called carbon neutral effect because the blended fuel uses ethanol obtained by fermenting and distilling plants, for instance, farm products such as sugarcane and corn. The above described carbon neutral effect means that the combustion of ethanol obtained from plants does not theoretically increase the amount of emitted carbon dioxide after all, because the plant of a raw material in itself has already absorbed carbon dioxide, and even when the ethanol obtained from the plant is combusted, it emits carbon dioxide in an equal amount to what the plant has already absorbed.

Accordingly, a blended fuel of gasoline and ethanol can reduce an amount of emitted carbon dioxide and contribute to the prevention of global warming, by being used for automotive fuel.

However, the above described blended fuel has a problem that the blended fuel cannot sufficiently develop the above described carbon neutral effect, because even though the ethanol uses plants, the ethanol also makes fossil fuel consumed in the production process and the distribution process. The above described blended fuel has also a problem of needing a higher cost than general gasoline fuel and making the movable distance of the automobile shorter than that of an automobile using the general gasoline fuel, when both automobiles have the same capacity of the fuel tank, because the ethanol has a heating value per unit volume in an amount of only a little over 60% of the general gasoline fuel.

As for a method of using the above described blended fuel, a technology has been already known which includes adding water to the blended fuel to separate the blended fuel into gasoline and ethanol, and using gasoline and ethanol each independently (cf. Japanese Patent Laid-Open No. 58-96155). However, the technology is a method of separating ethanol from the above described blended fuel, further reforming the separated ethanol into gas consisting of hydrogen and carbon monoxide, and using the reformed gas, and accordingly does not sufficiently use the blended fuel efficiently.

For this reason, the internal combustion engine is demanded which can efficiently use a blended fuel of gasoline and ethanol.

SUMMARY OF THE INVENTION

The present invention is designed with respect to such circumstances and is directed at providing an internal combustion engine system which uses a blended fuel of gasoline and ethanol, operates with high efficiency, and can reduce an emission amount of nitrogen oxide and the like.

In order to achieve the above object, the present invention provides an internal combustion engine system which can switch back and forth between spark ignition combustion and homogeneous charge compression ignition combustion, comprising: a fuel tank that accommodates a blended fuel having a research octane number (hereafter abbreviated to octane number) of 80 to 100, which has been prepared by blending gasoline having the octane number of 30 to 85 and ethanol into a weight ratio of 9:1 to 6:4; a separating means for adding water to the blended fuel to separate the blended fuel into gasoline and an ethanol-water mixture liquid; a reforming means for reforming ethanol contained in the ethanol-water mixture liquid into diethyl ether to produce a mixture liquid of diethyl ether and water; and respective fuel injectors which independently inject the gasoline, the ethanol-water mixture liquid and the mixture liquid of diethyl ether and water.

A blended fuel having an octane number of 80 to 100, which is equivalent to that of normal gasoline fuel, can be obtained by blending gasoline having an octane number of 30 to 85 with the above described ethanol into a range of the above described weight ratio, because the ethanol has a high octane number. The normal gasoline fuel is prepared by isomerizing, alkylating and/or catalytic-reforming distilled gasoline obtained by distilling crude oil, but the above described blended fuel can acquire an octane number of 80 to 100 equivalent to that of the normal gasoline fuel by blending the distilled gasoline with the above described ethanol into a range of the above described weight ratio. Accordingly, the blended fuel can eliminate treatments of the above described isomerization, alkylation and catalytic reforming, and a cost necessary for the treatments, and can be used in a normal gasoline-powered vehicle.

An internal combustion engine system according to the present invention accommodates the above described blended fuel in the above described fuel tank, and separates the blended fuel into above described gasoline having the octane number in a range of 30 to 85 and the above described ethanol-water mixture liquid, by supplying the blended fuel to the above described separating means from the fuel tank, and adding water to the blended fuel. In addition, the above described reforming means reforms one part of the above described ethanol-water mixture liquid into a mixture liquid of diethyl ether and water by reforming ethanol contained in the ethanol-water mixture liquid to diethyl ether.

As a result of this, an internal combustion engine system according to the present invention produces three types of fuels from the above described blended fuel, which are above described gasoline having the octane number in a range of 30 to 85, an ethanol-water mixture liquid, and a mixture liquid of diethyl ether and water. Here, ethanol has a higher octane number than the above described gasoline and diethyl ether has lower octane number than the above described gasoline, so that the internal combustion engine system can continuously change the octane number of fuel to be injected in a wide range, by injecting the above described three fuels from the above described fuel injectors at an arbitrary rate.

Thus, an internal combustion engine system according to the present invention can conduct combustion always in an optimal condition, by using the above described blended fuel and switching back and forth between spark ignition combustion and homogeneous charge compression ignition combustion according to an operating state, and accordingly can operate at high efficiency, decrease the emission amount of carbon dioxide, and inhibit nitrogen oxide from being discharged.

An internal combustion engine system according to the present invention can reliably keep combustion in an optimal condition, for instance, by conducting spark ignition combustion when a load is high and conducting homogeneous charge compression ignition combustion when the load is low.

When an internal combustion engine system according to the present invention conducts the above described spark ignition combustion, it is preferable that the system injects the above described gasoline produced by the above described separating means and the above described ethanol-water mixture liquid produced by the above described separating means, into an engine independently through the above described respective fuel injectors, at such a ratio that the mixed fuel acquires an octane number suitable for an operating state. The internal combustion engine system according to the present invention can ignite the fuel forcibly by spark always at the optimal timing without causing knocking by adjusting the octane number in the above manner, and accordingly can provide high thermal efficiency.

When an internal combustion engine system according to the present invention conducts the above described spark ignition combustion for starting the operation, it is also preferable that the system injects only the above described gasoline produced by the above described separating means, through the above described fuel injector. The internal combustion engine system can reliably start up the operation even at a low temperature, by conducting the above described spark ignition combustion with the use of only the above described gasoline.

On the other hand, when an internal combustion engine system according to the present invention conducts the above described homogeneous charge compression ignition combustion, it is preferable that the engine system injects any combination of fuels of: the above described gasoline produced by the above described separating means and the above described ethanol-water mixture liquid produced by the above described separating means; the above described ethanol-water mixture liquid produced by the above described separating means and the above described mixture liquid of diethyl ether and water produced by the above described reforming means; or the above described gasoline produced by the above described separating means and the above described mixture liquid of diethyl ether and water produced by the above described reforming means, into an engine independently through the above described respective fuel injectors, at such a ratio that the combined fuel acquires an octane number suitable for an operating state.

It is known that two peaks of a heating value appear along with the increase of the temperature and pressure of an atmosphere, in the above described homogeneous charge compression ignition combustion. The above described peak in the former step originates in a low temperature oxidation reaction (cold flame) which occurs in a comparatively-low-temperature atmosphere, and the peak in the latter step originates in a main combustion reaction (heat flame). Specifically, in the above described homogeneous charge compression ignition combustion, the above described low temperature oxidation reaction first occurs when the fuel-air mixture in a combustion chamber is compressed by a piston, thereby increasing the temperature of a fuel-air mixture by the generated heat, and induces the above described main combustion reaction to self-ignite the fuel.

The heating value of the above described low temperature oxidation reaction differs according to the value of an octane number. The lower octane number has the fuel, the more heat the fuel generates due to the above described low temperature oxidation reaction, and the more easily the fuel is self-ignited. Accordingly, the internal combustion engine system can control ignition timing of the above described homogeneous charge compression ignition combustion, by adjusting the octane number of the fuel.

An internal combustion engine system according to the present invention can change an octane number of the combined fuel to be injected in a contiguous wide range, by injecting any one combination of fuels of: the above described gasoline produced by the above described separating means and the above described ethanol-water mixture liquid; the above described ethanol-water mixture liquid produced by the above described separating means and the above described mixture liquid of diethyl ether and water produced by the above described reforming means; or the above described gasoline produced by the above described separating means and the above described mixture liquid of diethyl ether and water produced by the above described reforming means, independently through the above described respective fuel injectors. Accordingly, the internal combustion engine system according to the present invention can freely control the ignition timing of the above described homogeneous charge compression ignition combustion, according to the operating state, consequently can provide high thermal efficiency, and can reliably reduce an amount of discharged nitrogen oxide.

Furthermore, it is preferable that an internal combustion engine system according to the present invention comprises moisture-collecting means which condenses moisture contained in the exhaust gas, collects the water and supplies the water to the above described separating means. The internal combustion engine system provided with the above described moisture-collecting means according to the present invention can acquire water to be used for the above described separating means from the above described exhaust gas, and can separate the above described blended fuel into the above described gasoline and the above described ethanol-water mixture liquid without preparing a dedicated water tank.

DETAILED DESCRIPTION OF THE PREFERRED EMBODIMENTS

In the next place, preferred embodiments according to the present invention will be described in further detail with reference to the attached drawings.

Figure 1:
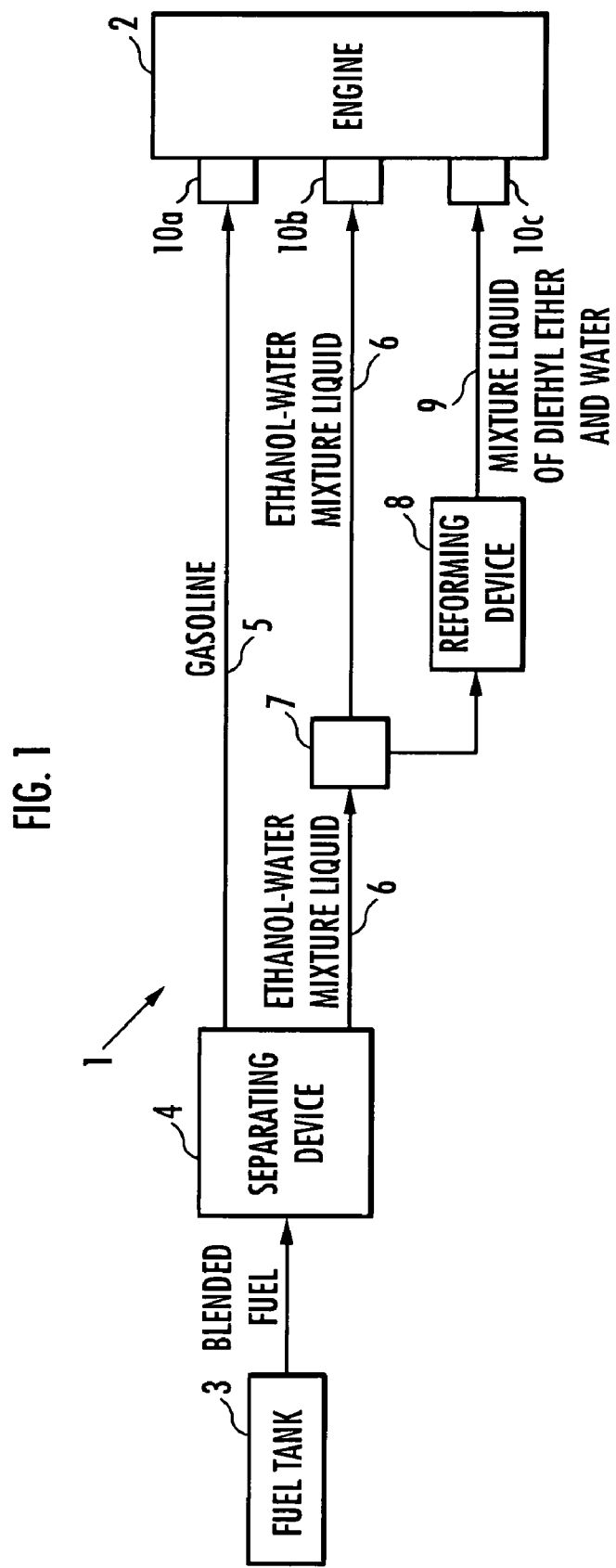
FIG. 1 is a system block diagram showing a configuration example of an internal combustion engine system according to the present invention.

As is shown in FIG. 1, an internal combustion engine system 1 according to the present embodiment comprises: an engine 2 which can switch back and forth between spark ignition combustion and homogeneous charge compression ignition combustion; a fuel tank 3 which accommodates a blended fuel consisting of gasoline and ethanol; a separating device 4 which separates the blended fuel supplied from the fuel tank 3 into the gasoline and an ethanol-water mixture liquid, by adding water to the blended fuel; a first duct 5 for supplying the above described gasoline obtained in the separating device 4 to the engine 2; and a second duct 6 for supplying the above described ethanol-water mixture liquid obtained in the separating device 4 to the engine 2. The internal combustion engine system 1 further comprises: a reforming device 8 for producing the mixture liquid of diethyl ether and water, by extracting one part of the above described ethanol-water mixture liquid which is supplied through a distributor 7 installed at some midpoint in the second duct 6 and reforming the ethanol contained in ethanol-water mixture liquid into diethyl ether; and the third duct 9 for supplying the above described mixture liquid of diethyl ether and water obtained in the reforming device 8, to the engine 2.

The engine 2 comprises a first fuel injector 10a, a second fuel injector 10b and a third fuel injector 10c, and the first fuel injector 10a, the second fuel injector 10b and the third fuel injector 10c are respectively connected to the first duct 5, the second duct 6 and the third duct 9. The fuel injectors 10a, 10b and 10c are formed so as to be able to independently inject the above described gasoline, the above described ethanol-water mixture liquid and the above described mixture liquid of diethyl ether and water respectively at an arbitrary feeding rate, while being controlled by a control unit which is not shown in the drawing.

The above described blended fuel accommodated in a fuel tank 3 consists of gasoline with the octane number of 30 to 85 and ethanol mixed at a weight ratio of 9:1 to 6:4, and has the octane number of itself in a range of 80 to 100. The above described blended fuel includes, for instance, a mixture of the gasoline with the octane number of 65 and ethanol mixed at a weight ratio of 7.5:2.5. Thus blended fuel has the octane number of 90. As the above described gasoline with the octane number of 65, for instance, the distilled gasoline as a raw material, which is obtained by distilling crude oil, but is not isomerized, alkylated or catalytic-reformed, may be used.

In the next place, an operation of the internal combustion engine system 1 according to the present embodiment will be described. The above described blended fuel to be used in the following description shall be the one which consists of gasoline with an octane number of 65 and ethanol mixed at a weight ratio of 7.5:2.5, and has the octane number of 90. The fuel can be used in a normal gasoline-powered vehicle as well, and is actually sold as gasohol in Brazil.

The internal combustion engine system 1 firstly introduces the above described blended fuel accommodated in the fuel tank 3 into the separating device 4, and adds water to the blended fuel to mix them in the separating device 4. Then, the above described blended fuel is separated into the gasoline and an ethanol-water mixture liquid, because the gasoline composing the blended fuel is hydrophobic and the above described ethanol is hydrophilic. At this time, the above described gasoline and the above described ethanol-water mixture liquid are separated into two layers of upper and lower layers in the separating device 4 so that the gasoline having relatively small specific gravity forms the upper layer and the ethanol-water mixture liquid having relatively large specific gravity forms the lower layer. Accordingly, the above described gasoline is taken out from the upper part of the separating device 4 through the first duct 5, and on the other hand, the above described ethanol-water mixture liquid can be taken out from the lower part of the separating device 4 through the second duct 6.

The water to be used for separating the above described blended fuel may be supplied to a separating device 4 from a single-purpose water tank, or may be formed by condensing moisture contained in gas exhausted from an engine 2 and collecting the water, and then supplied to the separating device 4, as will be described later.

Next, one part of the above described ethanol-water mixture liquid taken out from the separating device 4 through the second duct 6 is supplied to the reforming device 8 by the distributor 7. The reforming device 8 contains a solid acid catalyst such as active alumina, heteropolyacid, zeolite, silica-alumina, sulfated zirconia and ion exchange resin, and reforms ethanol contained in the ethanol-water mixture liquid to diethyl ether by making the above described ethanol-water mixture liquid contact with the solid acid catalyst. The above described ethanol causes a dehydration condensation reaction due to the above described solid acid catalyst when heated, and is easily converted to diethyl ether.

A temperature necessary for converting ethanol to diethyl ether in the above described reforming device 8 is normally 300° C. or lower, though depending on the type of a catalyst. Accordingly, the ethanol can be converted to the diethyl ether by using, for instance, the exhaust gas of the engine 2, as a heat source for the reforming device 8.

Thus obtained gasoline, ethanol-water mixture liquid and mixture liquid of diethyl ether and water are supplied to respective fuel injectors 10a, 10b and 10c through the first duct 5, the second duct 6 and the third duct 9 respectively. Then, the above described gasoline, ethanol-water mixture liquid and mixture liquid of diethyl ether and water are each independently injected from the respective fuel injectors 10a, 10b and 10c at an arbitrary feeding rate, while being controlled by a control unit which is not shown in the drawing.

Figure 2:
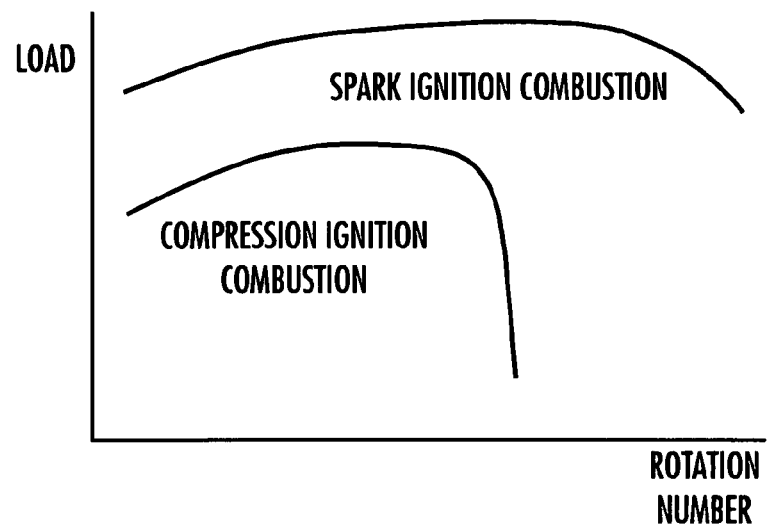
FIG. 2 is a diagrammatic drawing showing a region expressed by a required load and a rotating speed of the internal combustion engine system, in which spark ignition combustion or homogeneous charge compression ignition combustion is conducted.

The engine 2 has a structure of being switchable back and forth between spark ignition combustion and homogeneous charge compression ignition combustion according to the operating state, and conducts spark ignition combustion when a load and a revolution are high and homogeneous charge compression ignition combustion when a load and a revolution are low, as shown in FIG. 2.

When the internal combustion engine system 1 conducts spark ignition combustion at first, it supplies the above described gasoline to the first fuel injector 10a through the first duct 5, and simultaneously supplies the above described ethanol-water mixture liquid through the second duct 6 to the second fuel injector 10b, while controlling each independent amount of the above described supplied gasoline and the ethanol-water mixture liquid to be supplied, by using a control unit which is not shown by a diagram. Thus, by using the gasoline with the octane number of 65 and the ethanol-water mixture liquid, the internal combustion engine system 1 can change the octane number of the fuel in a contiguous range of 65 to 120.

When an ordinary internal combustion engine with the use of a single fuel such as gasoline causes knocking while conducting spark ignition combustion, the combustion engine usually avoids knocking by delaying ignition timing to later timing than the optimal one, but when avoiding knocking by using the above method, the engine 2 greatly decreases its thermal efficiency. In contrast to this, the internal combustion engine system 1 can provide excellent thermal efficiency, because the engine system 1 can avoid knocking while keeping the ignition timing to the optimal timing, by increasing the octane number of the fuel along with the increase of a required load, through increasing a feeding rate of the ethanol-water mixture liquid to be injected from the second fuel injector 10b.

However, it is occasionally difficult to start up the internal combustion engine system 1, particularly when the temperature of the engine system 1 is low. In such a case, the engine system 1 can be easily started up by injecting only the above described gasoline from the first fuel injector 10a. It is acceptable to supply the above described gasoline directly to the first fuel injector 10a from the separating device 4 through the first duct 5, or to store the above described gasoline separated by the separating device 4 in a sub-tank which is not shown in the drawing, and supply the gasoline to the first fuel injector 10a from the sub-tank. The above described sub-tank can be configured, for instance, so as to store the above described gasoline to be supplied through the first duct 5, and supply the gasoline to the first fuel injector 10a through the first duct 5.

Next, when conducting homogeneous charge compression ignition combustion, the internal combustion engine system 1 supplies the above described gasoline to the first fuel injector 10a through the first duct 5, and simultaneously supplies the above described ethanol-water mixture liquid to the second fuel injector 10b through the second duct 6; supplies the above described ethanol-water mixture liquid to the second fuel injector 10b through the second duct 6, and simultaneously supplies the above described mixture liquid of diethyl ether and water to a third fuel injector 10c through a third duct 9; or supplies the above described gasoline to the first fuel injector 10a through the first duct 5, and simultaneously supplies the above described mixture liquid of diethyl ether and water to the third fuel injector 10c through the third duct 9.

In the above combustion, the internal combustion engine system 1 also makes the control unit which is not shown in the drawing independently control each feeding rate of: the above described gasoline and the ethanol-water mixture liquid; the above described ethanol-water mixture liquid and the mixture liquid of diethyl ether and water; or the above described gasoline and the mixture liquid of diethyl ether and water. Thus configured internal combustion engine system 1 can change the octane number in a contiguous range of −50 to 120 if using the octane number for the convenience of expression, by using any combination of gasoline with the octane number of 65, the ethanol-water mixture liquid and the mixture liquid of diethyl ether and water, and changing each feed rate of those fuels.

In the above described homogeneous charge compression ignition combustion, when a fuel-air mixture is compressed in the combustion chamber by a piston, the fuel-air mixture firstly causes the low-temperature oxidation reaction to generate heat and subsequently causes the main combustion reaction due to the heat. A heating value in the above described low-temperature oxidation reaction varies with the octane number, and as the octane number of the fuel is lower, the fuel generates larger heat during the above described low-temperature oxidation reaction and causes self ignition more easily. Accordingly, the internal combustion engine system 1 can easily control the ignition timing of the above described homogeneous charge compression ignition combustion, by adjusting the octane number in the above described range.

When conducting the above described homogeneous charge compression ignition combustion, the internal combustion engine system 1 provides excellent thermal efficiency because a lean mixture can be combusted at a high compression ratio; and also can extremely reduce an amount of discharged nitrogen oxide because a combustion temperature is relatively lowered due to the above described lean burn.

In the next place, a moisture-collecting device will be described which condenses moisture contained in gas exhausted from the engine 2, collects water, and supplies the collected water to the separating device 4 for separating the above described blended fuel into two types of fuels.

Figure 3:
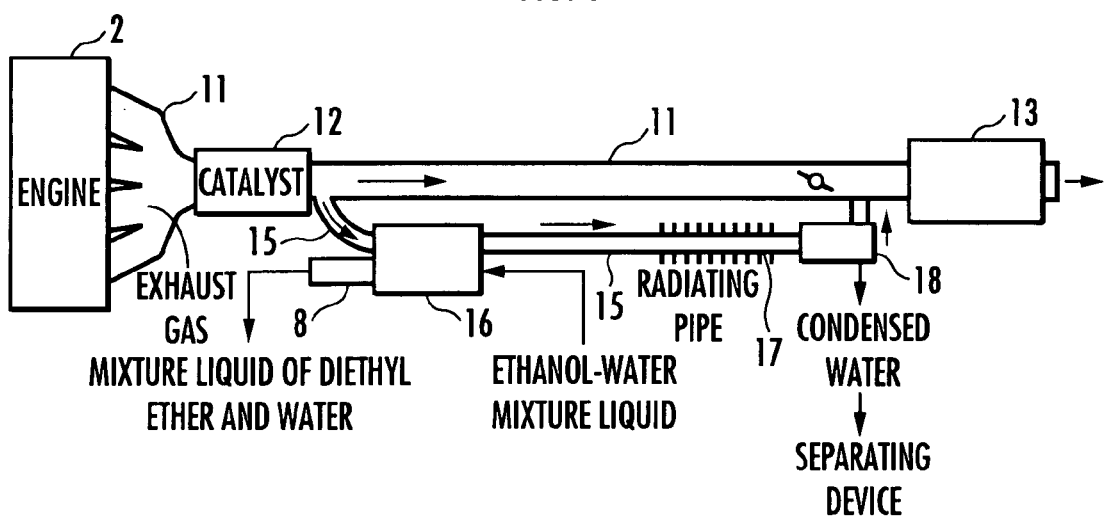
FIG. 3 is a system block diagram showing one configuration example of the moisture-collecting means which is used in an internal combustion engine system shown in FIG. 1.

At first, the engine 2 will be described with reference to FIG. 3, which comprises an exhaust pipe 11, a catalyst device 12 which is arranged at some midpoint in the exhaust pipe 11 and purifies the exhaust gas, and a muffler 13 arranged in the end of the exhaust pipe 11, so as to emit the exhaust gas into the air. Then, a moisture-collecting device 14 comprises: a branch pipe 15 which branches from the exhaust pipe 11 in a downstream of the catalyst device 12; a heat exchanger 16 which is arranged at some midpoint in the branch pipe 15; a radiating pipe 17; and a condensed-water-separating device 18 composed of a mist catch filter and others. The branch pipe 15 joins to the exhaust pipe 11 in a downstream of the condensed-water-separating device 18.

The moisture-collecting device 14 firstly supplies one part of the exhaust gas extracted through the branch pipe 15, to the heat exchanger 16, and exchanges heat with the above described ethanol-water mixture liquid which is to be supplied to the reforming device 8. Because the reforming device 8 needs heat in order to reform ethanol contained in the above described ethanol-water mixture liquid into diethyl ether as is described above, the above described heat exchange is useful which can heat the ethanol-water mixture liquid along with cooling the above described exhaust gas.

Subsequently, the above described exhaust gas is further cooled in the radiating pipe 17, and is then supplied to the condensed-water-separating device 18. There, moisture contained in the above described exhaust gas is condensed and the condensed water is collected by the mist catch filter and others. The condensed and collected water is supplied to the separating device 4.

Figure 4:
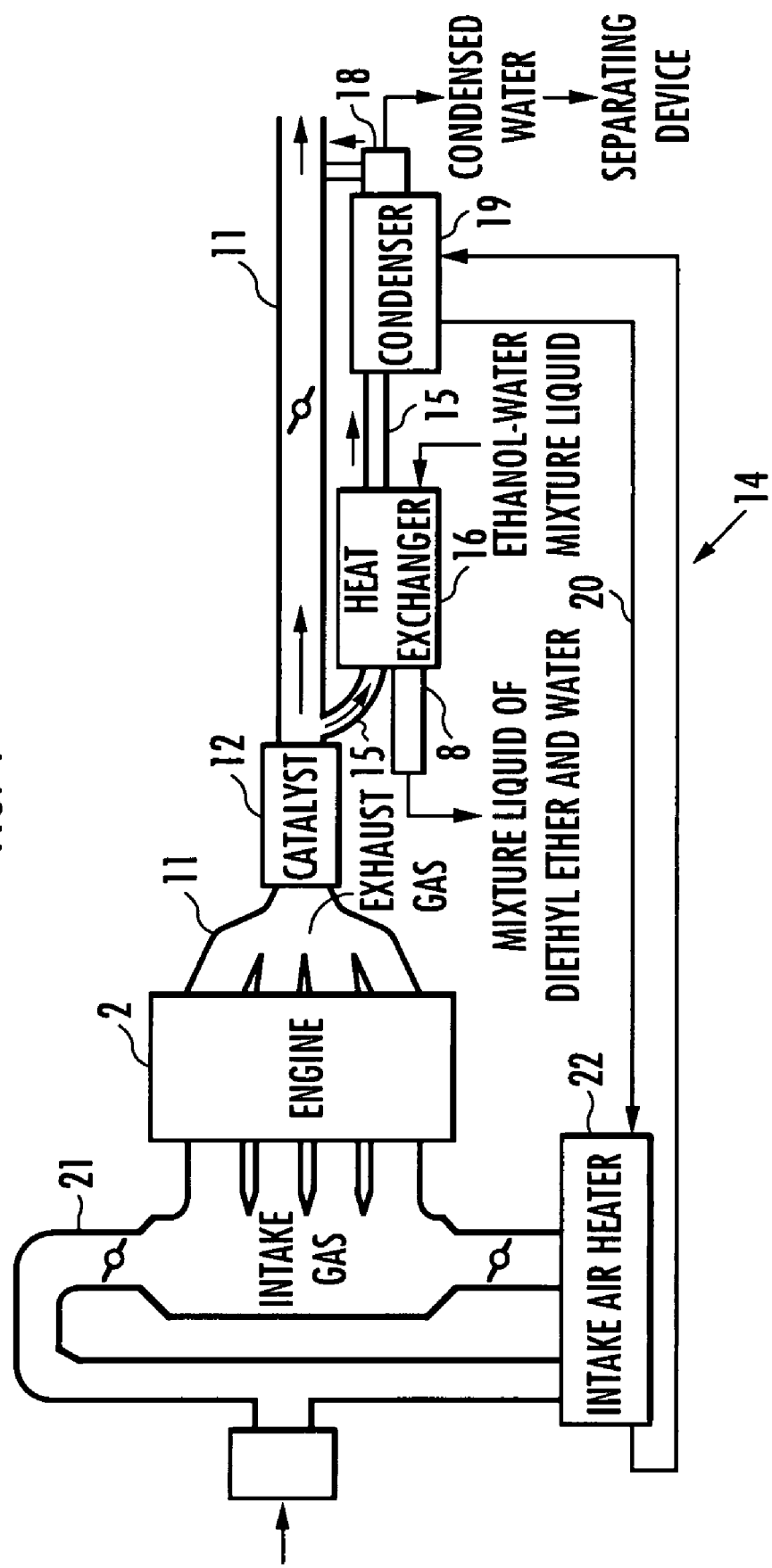
FIG. 4 is a system block diagram showing another configuration example of the moisture-collecting means which is used in an internal combustion engine system shown in FIG. 1.

Alternatively, the moisture-collecting device 14 may comprise a condenser 19 in place of the radiating pipe 17, as is shown in FIG. 4. In the moisture-collecting device 14, moisture contained in the above described exhaust gas is condensed into condensed water in the condenser 19, but the condensed water is still sufficiently hot. Then, the moisture-collecting device 14 supplies the above described condensed water to an intake air heater 22 arranged in an inlet pipe 21 of the engine 2 through a condensed water duct 20; makes the condensed water exchange heat with the intake gas; then refluxes the condensed water which has been cooled through the heat exchange, to the condenser 19; makes a condensed-water-separating device 18 installed in the downstream of the condenser 19 collect the condensed water. The condensed and collected water is supplied to the separating device 4.

Figure 5:
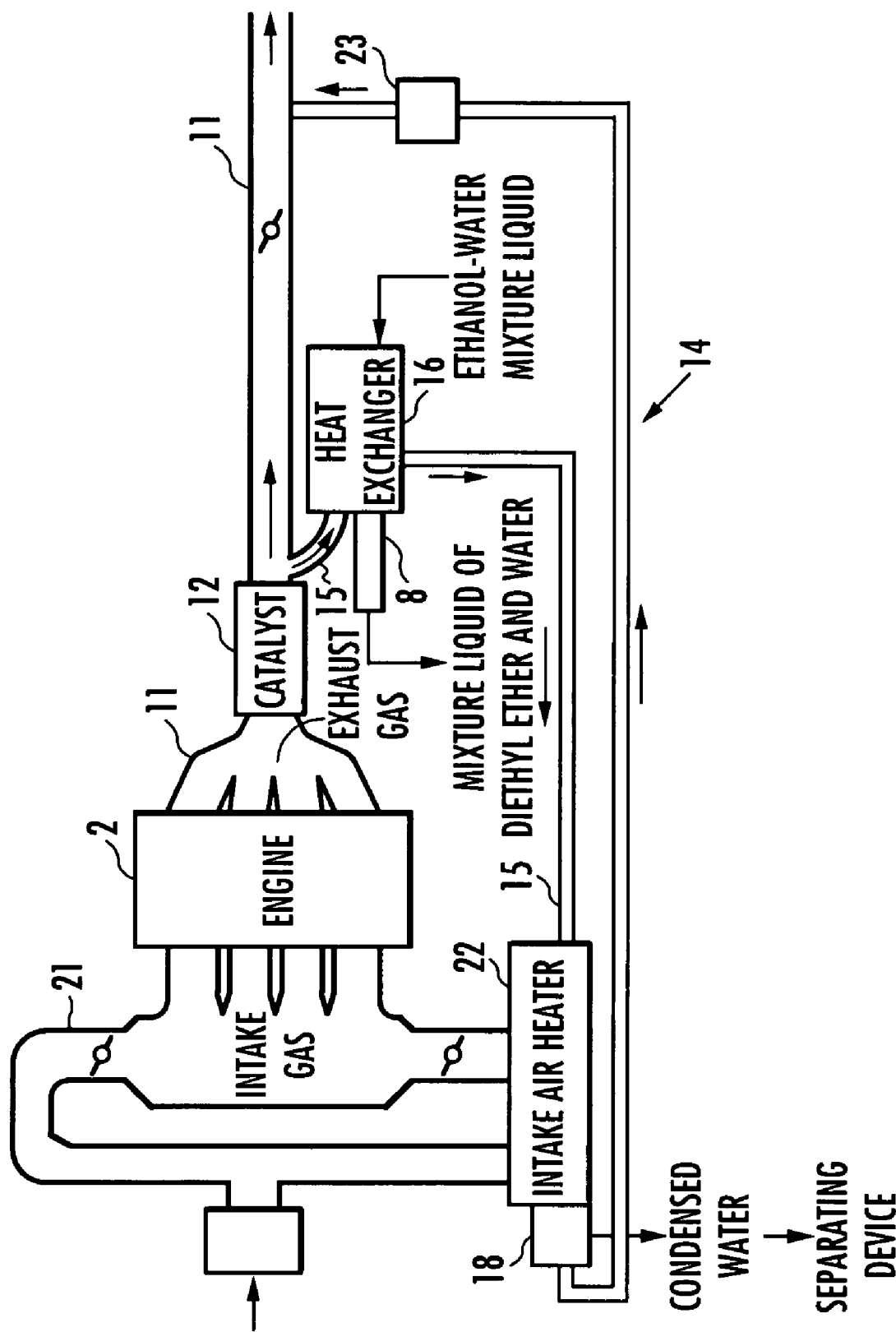
FIG. 5 is a system block diagram showing still another configuration example of the moisture-collecting means which is used in an internal combustion engine system shown in FIG. 1.

Furthermore, the moisture-collecting device 14 may be configured to supply the exhaust gas cooled by the heat exchanger 16 to the intake air heater 22 through the branch pipe 15, as is shown in FIG. 5. In this case, the condensed-water-separating device 18 is arranged in a downstream of the intake air heater 22, receives the exhaust gas which has been sufficiently cooled by two heat exchanges conducted in the heat exchanger 16 and the intake air heater 22, condenses moisture contained in the exhaust gas, and collects the condensed water. The condensed and collected water is supplied to the separating device 4. The exhaust gas from which the above described water has been separated by condensing joins to the exhaust pipe 11 through a control valve 23.

What is claimed is:

1. An internal combustion engine system which can switch back and forth between spark ignition combustion and homogeneous charge compression ignition combustion, comprising:
    a fuel tank that accommodates a blended fuel having a research octane number of 80 to 100, which has been prepared by blending gasoline having the research octane number of 30 to 85 and ethanol into a weight ratio between 9:1 and 6:4;
    a separating means for adding water to the blended fuel to separate the blended fuel into the gasoline and an ethanol-water mixture liquid;
    a reforming means for extracting one part of the ethanol-water mixture liquid, and reforming ethanol contained in the ethanol-water mixture liquid into diethyl ether to produce a mixture liquid of diethyl ether and water; and
    respective fuel injectors which independently inject the gasoline, the ethanol-water mixture liquid and the mixture liquid of diethyl ether and water.

2. The internal combustion engine system according to claim 1, further comprising conducting the spark ignition combustion when the load is high, and conducting the homogeneous charge compression ignition combustion when the load is low.

3. The internal combustion engine system according to claim 2, further comprising injecting the gasoline produced by the separating means and the ethanol-water mixture liquid produced by the separating means, into the engine independently through the respective fuel injectors, at such a ratio that the mixed fuel acquires a research octane number suitable for the operating state, when the engine conducts the spark ignition combustion.

4. The internal combustion engine system according to claim 3, further comprising injecting only the gasoline produced by the separating means into the engine through the fuel injector, when starting the engine.

5. The internal combustion engine system according to claim 2, further comprising injecting the gasoline produced by the separating means and the ethanol-water mixture liquid produced by the separating means, into then engine independently through the respective fuel injectors, at such a ratio that the mixed fuel acquires a research octane number suitable for the operating state, when the engine conducts the homogeneous charge compression ignition combustion.

6. The internal combustion engine system according to claim 2, further comprising injecting the ethanol-water mixture liquid produced by the separating means and the mixture liquid of diethyl ether and water produced by the reforming means, into the engine independently through the respective fuel injectors, at such a ratio that the mixed fuel acquires a research octane number suitable for the operating state, when the engine conducts the homogeneous charge compression ignition combustion.

7. The internal combustion engine system according to claim 2, further comprising injecting the gasoline produced by the separating means and the mixture liquid of diethyl ether and water produced by the reforming means into the engine independently through the respective fuel injectors, at such a ratio that the mixed fuel acquires a research octane number suitable for the operating state, when the engine conducts the homogeneous charge compression ignition combustion.

8. The internal combustion engine system according to claim 1, further comprising a moisture-collecting means which condenses moisture contained in the exhaust gas, collects the water and supplies the water to the separating means.

* * * * *